(12) United States Patent
Takahashi et al.

(10) Patent No.: US 7,787,340 B2
(45) Date of Patent: Aug. 31, 2010

(54) OPTICAL PICKUP

(75) Inventors: Kazuhiro Takahashi, Osaka (JP);
Hiromasa Sasaoka, Osaka (JP); Shinya Hatano, Osaka (JP); Ryozo Hosoda, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 517 days.

(21) Appl. No.: 11/905,627

(22) Filed: Oct. 2, 2007

(65) Prior Publication Data

US 2008/0095020 A1 Apr. 24, 2008

(30) Foreign Application Priority Data

Oct. 3, 2006 (JP) ............................. 2006-271571

(51) Int. Cl.
*G11B 17/00* (2006.01)

(52) U.S. Cl. .................................. 369/53.19; 369/244.1

(58) Field of Classification Search ........................ None
See application file for complete search history.

(56) References Cited

U.S. PATENT DOCUMENTS

2002/0135893 A1* 9/2002 Hirose et al. ................ 359/819

2005/0286355 A1* 12/2005 Kim et al. ................ 369/44.14
2006/0018214 A1 1/2006 Fujii et al.

FOREIGN PATENT DOCUMENTS

| EP | 1612778 | 1/2006 |
|---|---|---|
| JP | A-S62-170028 | 7/1987 |
| JP | 05101429 A * | 4/1993 |
| JP | A-H7-057273 | 3/1995 |
| JP | A-H9-230111 | 9/1997 |
| JP | A-2003-272198 | 9/2003 |
| WO | WO 2005/004128 | 1/2005 |

* cited by examiner

*Primary Examiner*—Joseph H Feild
*Assistant Examiner*—Tawfik Goma
(74) *Attorney, Agent, or Firm*—Morgan Lewis & Bockius LLP

(57) ABSTRACT

The optical pickup includes two objective lenses, and an objective lens holder that holds the two objective lenses. The objective lens holder has two fixture holes that pass through from the lower surface to the upper surface to which the two objective lenses are attached at an upper portion with space between them. The fixture hole is provided with a fixed lens supporting portion and two movable lens supporting portions for supporting the objective lens and adjusting tilt degree thereof. The movable lens supporting portion includes a through hole that passes through to the upper portion of the fixture hole and a column member that is inserted in the through hole in a slidable manner.

12 Claims, 9 Drawing Sheets

OPTICAL PICKUP

This application is based on Japanese Patent Application No. 2006-271571 filed on Oct. 3, 2006, the contents of which are hereby incorporated by reference.

BACKGROUND OF THE INVENTION

1. Field of the Invention

The present invention relates to an optical pickup that projects a laser beam onto an optical disc for reproducing or recording information. In particular, the present invention relates to an optical pickup having lenses with different numerical apertures for recording or reproducing information on a CD, a DVD and a BD.

2. Description of Related Art

An optical disc apparatus records or reproduce information on the optical disc as a recording medium by projecting a laser beam onto the optical disc from the optical pickup. If the optical disc apparatus supports a CD (Compact Disc) medium and a DVD (Digital Versatile Disc) medium, the optical pickup is equipped with a laser light source that emits infrared laser (having a wavelength of approximately 780 nm) for a CD and red laser (having a wavelength of approximately 650 nm) for a DVD medium. In addition, the optical pickup is equipped with an objective lens that condenses the laser beam to make a laser spot on a recording surface of the optical disc. A diameter of the laser spot is proportional to a wavelength of the laser beam and is inversely proportional to a numerical aperture (NA) of the objective lens. Since the CD medium and the DVD medium have different track widths, different objective lenses are necessary. However, a single objective lens can support both the CD medium and the DVD medium by modifying a shape of the objective lens.

In addition, the optical pickup detects reflection light from the optical disc so as to detect a position of the laser spot on the optical disc or read information. For this reason, the laser beam should be projected onto the optical disc so that an angle between the optical axis of the laser beam and the recording surface of the optical disc (tilt angle) is always a constant angle (right angle in many cases).

Therefore, in an invention described in JP-A-H7-57273, a lower surface of the objective lens facing a objective lens retaining portion is provided with a spherical seat, so that the objective lens can rotate in a plane crossing in the optical axis direction for adjusting an inclination (tilt angle) of the optical axis of the objective lens.

In a invention described in JP-A-S62-170028, the objective lens is fixed, and adjustment of inclination (tilt angle) of the optical axis of the objective lens is performed by adjusting inclination of the actuator with respect to the optical pickup utilizing a protrusion formed on the optical pickup main body and a spacer that is disposed between the actuator and the optical pickup as for the attachment angle of the actuator for driving the objective lens with respect to the optical pickup main body.

In a invention described in JP-A-2003-272198, the optical pickup includes an objective lens holder that holds an objective lens, a shaft portion that supports the objective lens holder in a slidable manner, an actuator base that supports the shaft portion, and a spring between the actuator base and a frame. An angle between the actuator base and the frame is adjusted by adjusting an adjustment screw that is provided to the actuator base, so that adjustment of inclination of the objective lens is performed.

Recently, in addition, a BD (Blu-Ray Disc) having larger storage capacity than a DVD has been available. Since recording density of a BD medium is higher than that of a DVD medium, a track width of a BD medium is much smaller than that of a DVD medium, so a laser spot for a BD medium should be small. Therefore, in order to perform recording and reproducing information on a BD medium, a laser light source that emits blue laser having smaller wavelength (approximately 405 nm) than the infrared laser and the red laser is used.

On the other hand, since a numerical aperture of the objective lens for a CD/DVD is too small to condense the blue laser appropriately for recording or reproducing information on a BD accurately. In addition, if the objective lens for a BD is used, the infrared laser and the red laser cannot be condensed appropriately. Therefore, there is proposed a lens holder for holding the objective lens to which two objective lenses having different numerical apertures for a CD/DVD and for a BD are disposed.

If the optical pickup having two objective lenses of different numerical apertures are used, optimal laser spots can be formed on the recording surfaces of optical discs having different track widths, so that recording and reproducing can be performed accurately.

In the case of the optical pickup having two different objective lenses as described above, tilt angles of the objective lenses can be different from each other due to manufacturing errors of the objective lenses or assembling errors when they are attached to the objective lens holder. In this state, if the optical pickup is adjusted so that optical axis of the laser beam becomes perpendicular to the recording surface of the optical disc with respect to one of the tilt angles of the objective lenses in accordance with the method described in JP-A-S62-170028 or JP-A-2003-272198, the optical axis of the laser beam going out from the other objective lens is not always perpendicular to the recording surface of the optical disc. It is because that a tilt error when the objective lens is attached to the lens holder or a shape error of a mounting portion is not always the same between the objective lenses.

Therefore, JP-A-H9-230111 discloses a structure in which two objective lenses are formed by integral molding. By forming the two objective lenses by integral molding, it is able to suppress generation of a tilt error between the objective lens and the lens holder, and a tilt angle error of the objective lenses due to a shape error of the attaching portion of the lens holder.

However, if the objective lenses having different numerical apertures are molded integrally like the invention described in JP-A-H9-230111, there may be a case where a malfunction occurs depending on a condition of the molding or a condition of a process after the molding, in which tilts of optical axes of the two objective lenses are different. In this case, since the two objective lenses are molded integrally, they cannot be adjusted separately with respect to their tilt angles. Therefore, it is necessary to improve accuracy of the molding, which causes increase of cost of manufacturing the lenses and the optical pickup.

In addition, it is possible to adjust each of the two objective lenses by utilizing a mechanism for adjusting the objective lens like the invention described in JP-A-H7-57273. However, if the adjustment mechanism for the objective lens is provided, spherical seats for the objective lens and the objective lens mounting portion should be formed. Therefore, manufacturing cost of the objective lens and the optical pickup may increase. In addition, since a plurality of adjustment mechanisms are necessary, a structure of the optical pickup becomes complicated, weight of the lens holder increases, and effort and time are necessary for assembling and adjustment.

SUMMARY OF THE INVENTION

An object of the present invention is to provide an optical pickup equipped with two objective lenses having different numerical apertures, which can adjust a difference between optical axes of the two objective lenses by a simple operation.

Another object of the present invention is to provide an optical pickup equipped with two objective lenses having different numerical apertures, which can improve accuracy of recording or reproducing information on a plurality of optical disc media such as a CD, a DVD, a BD and the like even if manufacturing and/or assembling error occurs in an objective lens and an objective lens holder.

An optical pickup according to an embodiment of the present invention includes two objective lenses having different numerical apertures, and an objective lens holder that holds the two objective lenses. The objective lens holder has two fixture holes that pass through from the lower surface to the upper surface to which the two objective lenses are attached with space between them. One of the fixture holes supports the lower surface of the objective lens that is attached to the fixture hole and equipped with a tilt degree adjustment mechanism for adjusting an angle of the objective lens. The tilt degree adjustment mechanism has one fixed lens supporting portion and a plurality of movable lens supporting portions that can slide in a direction along the fixture hole. The movable lens supporting portion has a through hole that passes through the lens holder from the lower surface to an upper portion of one of the fixture holes and a column member that is inserted in the through hole in a slidable manner. The column member is fixed by adhesive.

According to this structure, tilt degree of the objective lens can be adjusted easily by sliding the column member. Since tilt degree is adjusted only for one of the objective lenses disposed at the fixture holes, effort of adjusting tilt degree can be reduced so that effort and time necessary for manufacturing and assembling the optical pickup can be reduced.

In addition, since tilt degree of the objective lens that is attached to one of the fixture holes can be adjusted, the objective lenses can be adjusted to have the same or substantially the same tilt degree even if accuracies of the one of the fixture holes and an attaching portion of the objective lens attached to the fixture hole, and accuracies of the other and an attaching portion of the objective lens attached to the other fixture hole are not high. Therefore, it is possible to record or reproduce information on different types of optical disc media (a CD, a DVD and a BD) accurately.

In a preferred embodiment of the present invention, the tilt degree adjustment mechanism includes a fixed lens supporting portion and two movable lens supporting portions. One point is fixed and heights of two points are adjusted so that the optical axis of the objective lens can be tilted in a three-dimensional manner. Thus, adjustment of tilt degree can be performed accurately by little adjustment points.

In a preferred embodiment of the present invention, the through hole has a cylindrical shape while the column member has a cylindrical column shape. In addition, the column member may be fit in the through hole by light press fitting. Furthermore, the inner circumferential portion of the through hole is provided with a female screw thread while the outer circumferential portion of the column member is provided with a male screw thread, so that the column member engages with the through hole. In this case, the lower end portion of the through hole may be used as an injection hole for adhesive.

In this way, the column member can be engaged by light press fitting or by screw thread engagement so as to retain the objective lens temporarily for easy angle adjustment. Thus, effort and time for the adjustment can be reduced.

In a preferred embodiment of the present invention, the column member engages with the through hole with a clearance between them. In this case, the column member will slide downward by its weight along the through hole. Therefore, a jig or the like may be inserted from the lower side of the through hole so as to support the column member. After the adjustment of tilt degree of the objective lens is finished, it is adhered and the jig is removed. In this case, since the objective lens is not pressed at the upper portion, it is able to suppress occurrence of a malfunction such as deformation or breakage of the objective lens due to a constrained force that can be applied to it. The objective lens holder may be provided with an adhesive injection hole that communicates to the through hole at the side surface. Adhesive can be injected through this adhesive injection hole so that the column member can be fixed to the through hole easily.

In a preferred embodiment of the present invention, the objective lens holder is supported by elastic supporting members, and electric power is supplied via the elastic supporting members to a tracking coil and a focusing coil that are provided for driving the objective lens holder (so-called wire supporting type), or the objective lens holder is supported in a slidable and rotatable manner by a rotating shaft that passes through the objective lens holder (so-called shaft sliding type).

In a preferred embodiment of the present invention, media that can be used for recording or reproducing information include a CD medium, a DVD medium and a BD medium. The CD medium includes a CD-ROM medium, a CD-R medium, a CD-RW medium and the like, while the DVD medium includes a DVD-ROM medium, a DVD-R medium, a DVD+R medium, a DVD-RW medium, a DVD+RW medium, a DVD-RAM medium and the like.

An optical pickup according to another embodiment of the present invention includes an infrared laser light source that emits an infrared laser beam, a red laser light source that emits a red laser beam, a blue laser light source that emits a blue laser beam, a first objective lens that condenses the infrared laser beam or the red laser beam onto a recording surface of a CD medium or a DVD medium, a second objective lens that condenses the blue laser beam onto a recording surface of a Blu-ray Disc medium, an objective lens holder that holds the first objective lens and the second objective lens, and can move in a tracking direction and in a focusing direction, a tracking coil that generates a thrust force for moving the objective lens holder in the tracking direction, a focusing coil that generates a thrust force for moving the objective lens holder in the focusing direction, and elastic supporting members that support the objective lens holder in an elastic manner and are used for supplying electric power to the tracking coil and the focusing coil. The objective lens holder has a first fixture hole that passes through from the lower surface to the upper surface to which the first objective lens is attached at an upper portion, and a second fixture hole that passes through from the lower surface to the upper surface to which the second objective lens is attached at an upper portion. The first fixture hole is provided with a tilt degree adjustment mechanism for supporting the lower surface of the first objective lens and adjusting an angle of the first objective lens. The tilt degree adjustment mechanism includes a fixed lens supporting portion that is fixed to the inner circumferential surface of the first fixture hole so as to protrude, and two movable lens supporting portions that are disposed at positions away from the fixed lens supporting portion by the same angle and can slide in the direction along the first fixture hole. The movable lens supporting portion includes a cylindrical through hole that passes through from the lower surface of the lens holder to an upper portion of the first fixture hole and a column member that is fit in the through hole by light press fitting. Adhesive is applied to the through hole so as to fix the column member from the lower side.

DETAILED DESCRIPTION OF THE PREFERRED EMBODIMENTS

Figure 1:
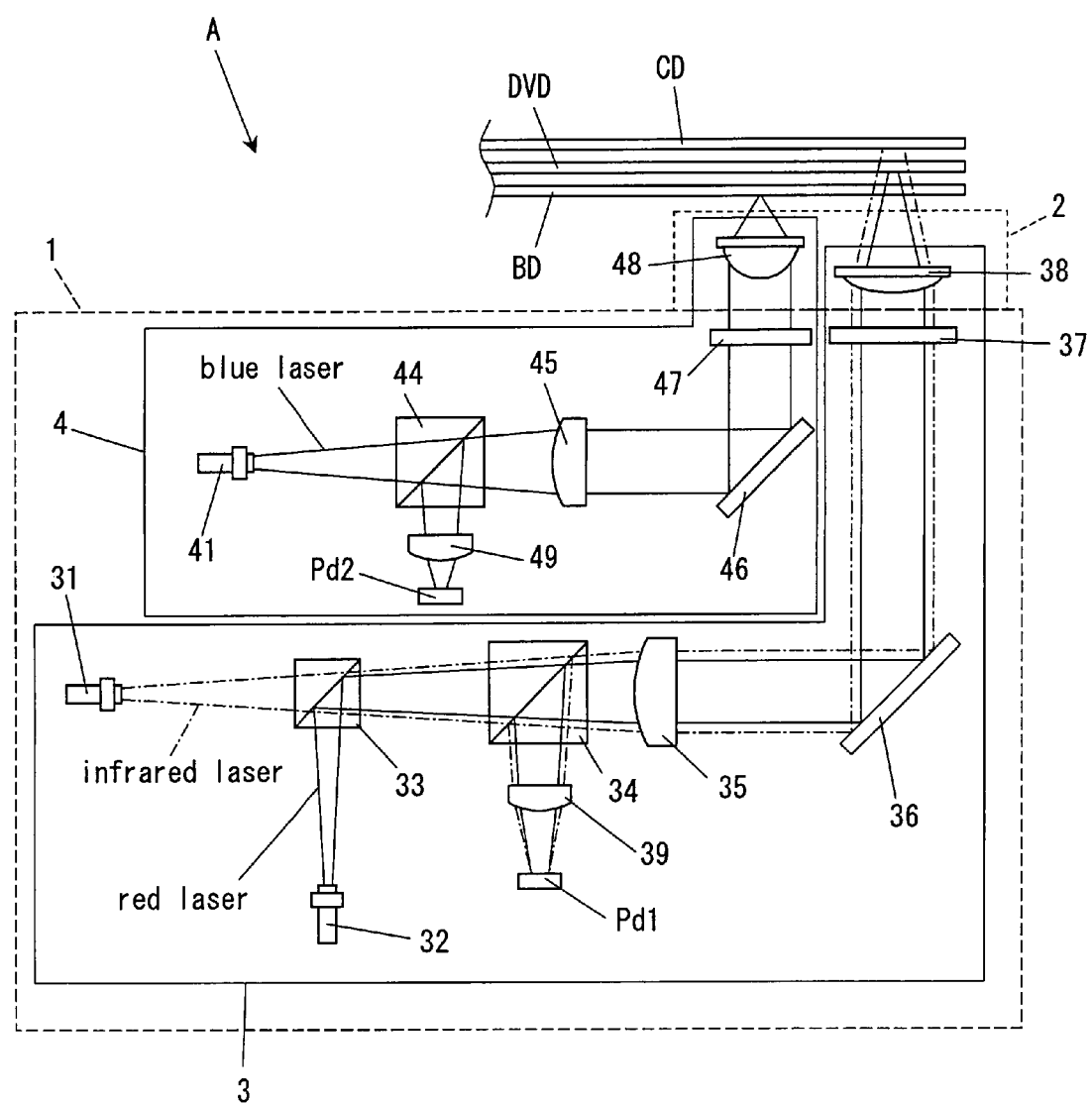
FIG. 1 is an arrangement plan showing a structure of an example of an optical pickup according to the present invention.

Hereinafter, an embodiment of the present invention will be described with reference to the attached drawings. FIG. 1 is an arrangement plan showing a structure of an example of an optical pickup according to the present invention. The optical pickup A shown in FIG. 1 includes a main body 1 and an actuator 2 that drives objective lenses. The optical pickup A shown in FIG. 1 includes a first optical system 3 for recording or reproducing information on a CD medium or a DVD medium, and a second optical system 4 for recording or reproducing information on a BD. As for the optical pickup shown in FIG. 1, an optical path of infrared laser is shown by a dashed dotted line, and an optical path of red laser is shown by a solid line, for convenience sake. In addition, an optical path of blue laser is also shown by a solid line. Here, the CD medium includes a CD-ROM medium, a CD-R medium, a CD-RW medium and the like, while the DVD medium includes a DVD-ROM medium, a DVD-R medium, a DVD+R medium, a DVD-RW medium, a DVD+RW medium, a DVD-RAM medium and the like.

The first optical system 3 includes at least an infrared laser light source 31, a red laser light source 32, a dichroic prism 33, a polarizing beam splitter 34, a collimator lens 35, an upstand mirror 36, a quarter wavelength plate 37, a first objective lens 38, a sensor lens 39 and a light receiving element Pd1.

The infrared laser light source 31 emits an infrared laser beam having a wavelength of approximately 780 nm, which is used for recording or reproducing information on a CD medium. The red laser light source emits a red laser beam having a wavelength of approximately 650 nm, which is used for recording or reproducing information on a DVD medium. The dichroic prism 33 is a prism that permits light having a wavelength in an infrared range to pass through and reflects light having a wavelength in red range. In other words, the laser beam emitted from the infrared laser light source 31 passes through the dichroic prism 33, while the laser beam emitted from the red laser light source 32 is reflected by a reflection plane of the dichroic prism 33 and goes out from the dichroic prism 33. Although the dichroic prism of the present invention has a structure in which the infrared laser beam passes through while the red laser beam is reflected, this structure should not be interpreted in a limiting manner.

The polarizing beam splitter 34 is a prism that pass or reflect an incident laser beam in accordance with a polarization direction thereof. In the present invention, the laser beams emitted from the infrared laser light source 31 and the red laser light source 32 and enter the polarizing beam splitter 34 pass through it, while the laser beam reflected by a recording surface of a CD medium or a DVD medium is reflected by the polarizing beam splitter 34. The collimator lens 35 converts the laser beam that is diverging light emitted from the infrared laser light source 31 or the red laser light source 32 as a point light source into parallel rays. The laser beam going out from the collimator lens 35 is reflected by the upstand mirror 36 to be in the orthogonal direction. In this way, the optical path of the laser beam becomes perpendicular to the recording surface of the CD medium or the DVD medium.

The quarter wavelength plate 37 converts incident light with linear polarization into light with circular polarization or converts incident light with circular polarization into light with linear polarization. As the first objective lens 38, an aspherical lens is adopted. The first objective lens 38 can condense the infrared laser beam to be a laser spot on the recording surface of the CD medium and condense the red laser beam to be a laser spot on the recording surface of the DVD medium.

The laser beam reflected by the recording surface of the CD medium or the DVD medium enters the quarter wavelength plate 37 again. Thus, the reflection laser beam with the circular polarization is converted into a laser beam with linear polarization. The polarization direction of the laser beam after the conversion into linear polarization light is perpendicular to the polarization direction of the laser beam emitted from the infrared laser light source or the red laser light source. Therefore, the laser beam does not pass through the polarizing beam splitter 34 but is reflected by the same so as to enter the light receiving element Pd1 via the sensor lens 39. The light receiving element Pd1 converts the incident laser beam into an electric signal, which is used as an output signal for recording or reproducing information.

The second optical system 4 includes at least a blue laser light source 41, a polarizing beam splitter 44, a collimator lens 45, an upstand mirror 46, a quarter wavelength plate 47, a second objective lens 48, a sensor lens 49 and a light receiving element Pd2. The second optical system 4 is different from the first optical system 3 in that it includes the blue laser light source 41 that emits blue laser beam having a wavelength of approximately 405 nm as the laser light source and the second objective lens 48 as the objective lens but it does not include the dichroic prism 33. However, other structural elements are the same as those of the first optical system 3, so detailed description thereof will be omitted.

Among the optical elements described above, the first objective lens 38 of the first optical system 3 and the second objective lens 48 of the second optical system 4 are disposed in the actuator 2. The actuator 2 is attached to the main body 1.

Figure 2:
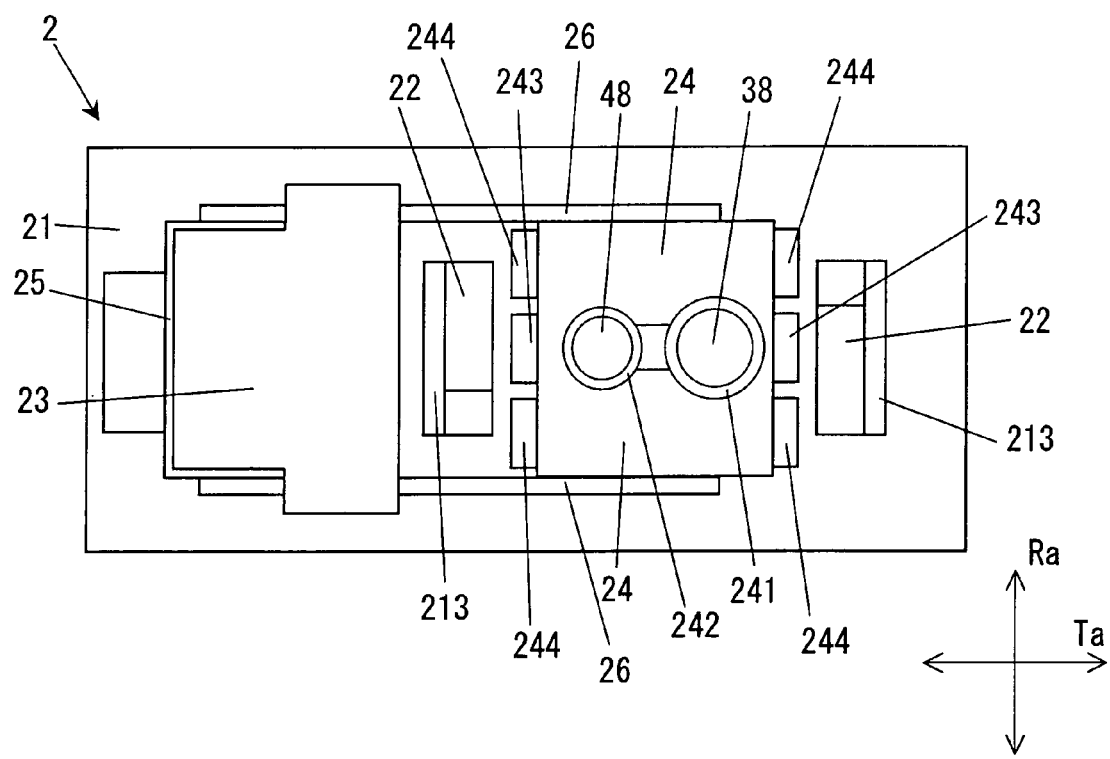
FIG. 2 is a plan view of an example of an actuator that is provided to the optical pickup according to the present invention.
Figure 3:
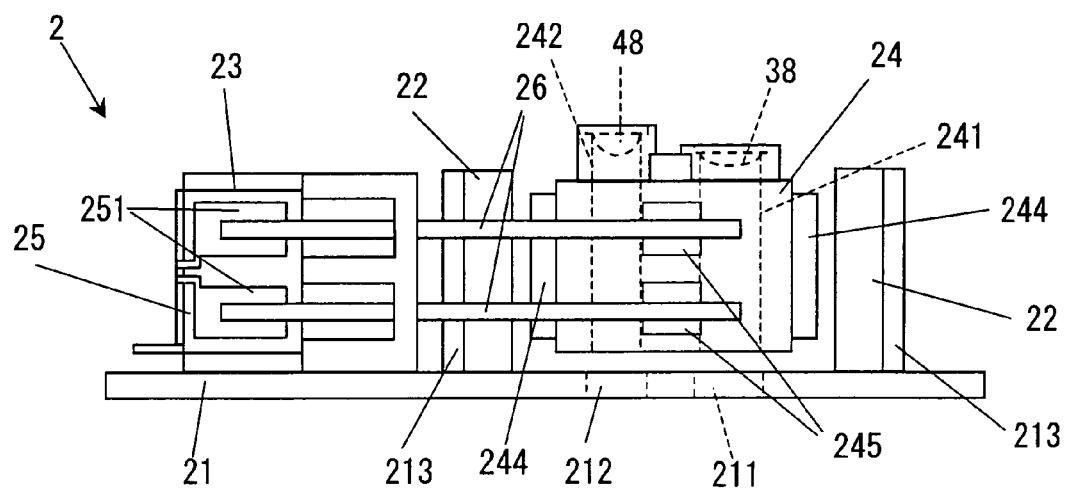
FIG. 3 is a front view of the actuator shown in FIG. 2.
Figure 4:
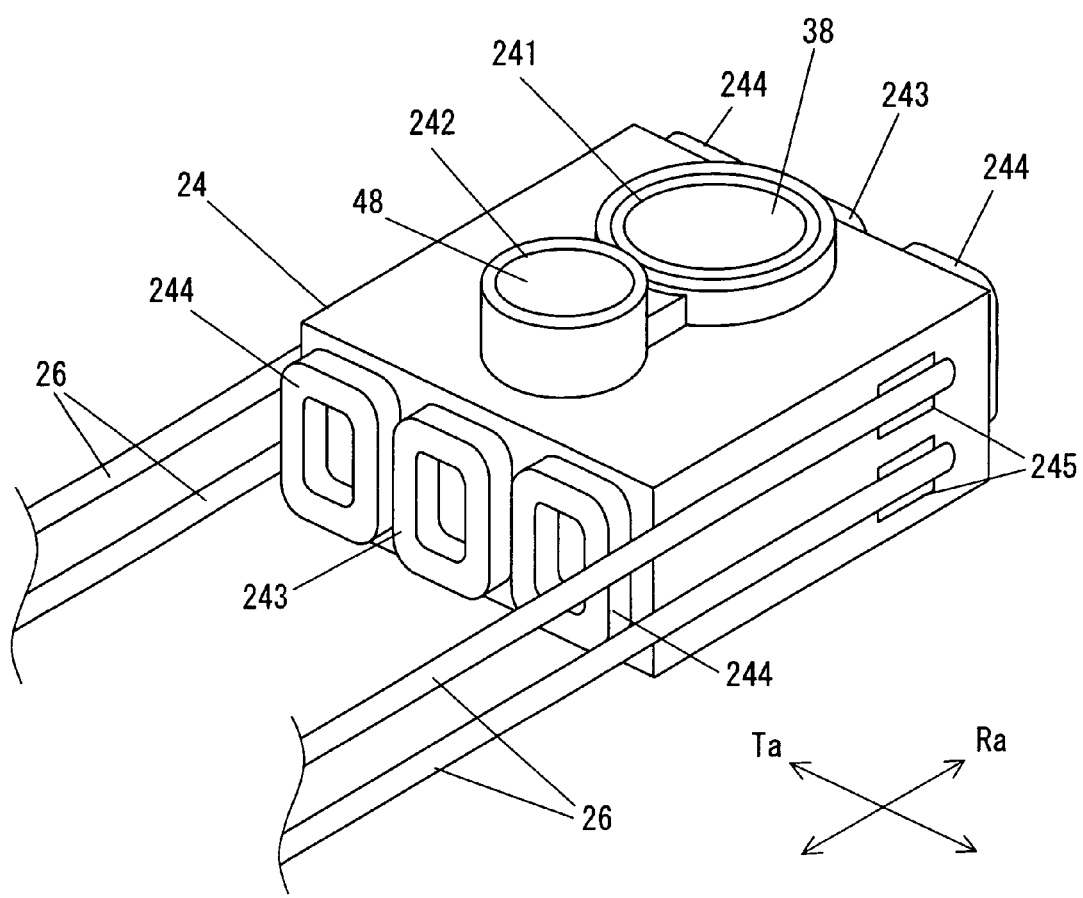
FIG. 4 is an enlarged perspective view of an objective lens holder that is used in the actuator shown in FIG. 2.

FIG. 2 is a plan view of an example of the actuator provided to the optical pickup according to the present invention, FIG. 3 is a front view of the actuator shown in FIG. 2, and FIG. 4 is an enlarged perspective view of the objective lens holder used in the actuator shown in FIG. 2. The actuator 2 includes an actuator base 21, a permanent magnet 22, a supporting member 23, an objective lens holder 24 that holds the first objective lens 38 and the second objective lens 48, a power circuit board 25 and wire springs 26. Reference Ta in FIG. 2 denotes a tangential direction (circumferential direction) of the optical disc medium (a CD medium, a DVD medium and a BD medium), while reference Ra denotes a radial direction of the same. As shown in FIGS. 2 and 4, the first objective lens 38 and the second objective lens 48 are arranged side by side in the Ta direction of the optical pickup A.

The actuator base 21 is formed by stamping and pressing metal sheet. The actuator base 21 has a first through hole 211 for the infrared laser beam or the red laser beam to pass through, a second through hole 212 for the blue laser beam to pass through, and a magnet retaining portion 213 that retains the permanent magnet 22 and works as a back yoke. The permanent magnet 22 generates a magnetic field that acts upon the objective lens holder 24 and is made up of a neodymium magnet though it is not limited to. The supporting member 23 is made of a resin and is fixed securely to the actuator base 21 by using a bolt (not shown). In addition, other means such as engagement, welding, adhesion or the like can be adopted instead of the bolt for fixing it so as not to be removed from the actuator base 21.

The objective lens holder 24 includes a first fixture hole 241 passing through from the lower surface to the upper surface to which the first objective lens 38 is fixed at the upper surface end, a second fixture hole 242 passing through from the lower surface to the upper surface to which the second objective lens 48 is fixed, a focusing coil 243 for moving the objective lens holder 24 in the optical axis direction, a tracking coil 244 for moving the objective lens holder 24 in the radial direction of the optical disc, and connection terminals 245 for supplying electric power to the focusing coil 243 and the tracking coil 244.

The power circuit board 25 is a FPC (Flexible Printed Circuit) having flexibility in this example, which is adhered to the supporting member 23 so as to cover a part of it. Other material can be adopted for the power circuit board 25 instead of the FPC, which can be attached to the supporting member 23 stably. The power circuit board 25 is provided with terminal portions 251 for supplying electric power.

The objective lens holder 24 is supported by the supporting member 23 via the wire springs 26 so that bottom portion thereof does not contact with the actuator base 21. The wire springs 26 are elastic members having conductivity, which are fixed so as to contact with the connection terminals 245 of the objective lens holder 24. In addition, the wire springs 26 contact with the terminal portions 251 of the power circuit board 25 that are fixed to the supporting member 23. In this way, the terminal portions 251 are connected electrically with the connection terminals 245 via the wire springs 26, so that electric power is supplied from the power circuit board 25 to the focusing coil 243 and the tracking coil 244 via the wire springs 26.

Figure 5:
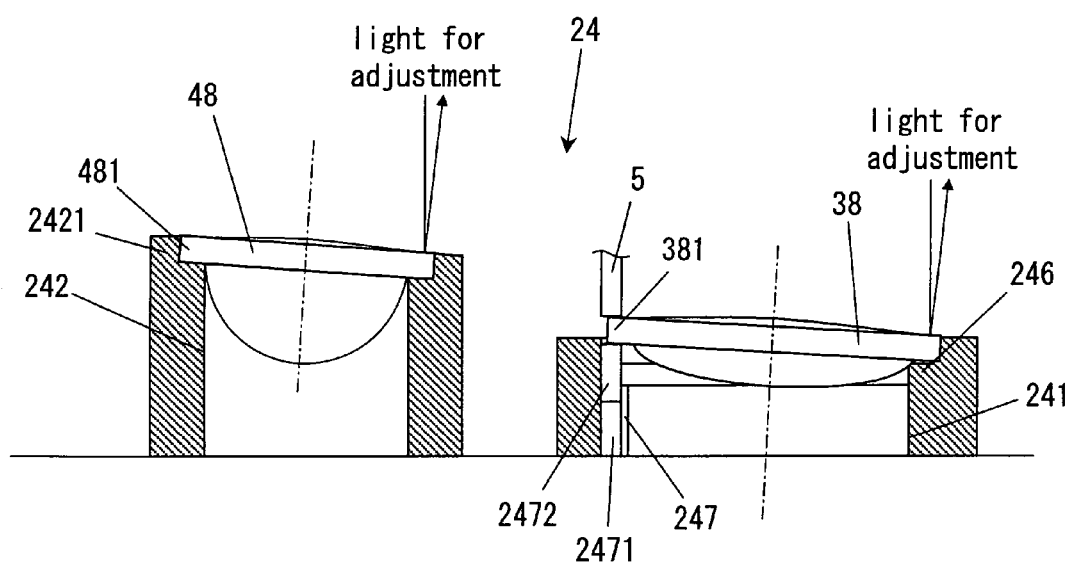
FIG. 5 is a cross sectional view of an objective lens mounting portion of the objective lens holder.

The objective lens holder 24 will be described more in detail. FIG. 5 is a cross sectional view of an objective lens mounting portion of the objective lens holder. As for the objective lens holder 24 shown in FIG. 5, the mounting portion of the second lens fixture hole 242 is tilted due to an error or the like, so the second objective lens 48 is mounted in the state where its optical axis is tilted. FIG. 5 shows the tilt in an exaggerated manner for easy recognition. As shown in FIG. 5, the first objective lens 38 and the second objective lens 48 have flange-like retained portions 381 and 481, respectively.

The first objective lens 38 for recording or reproducing information on a CD medium or a DVD medium and the second objective lens 48 for recording or reproducing information on a BD medium are mounted on the objective lens holder 24. The second objective lens 48 has a larger numerical aperture (NA=0.85) and a shorter focal length than the first objective lens 38 does. Therefore, as shown in FIGS. 4 and 5 and the like, the first lens fixture hole 241 and the second lens fixture hole 242 are formed so that the mounting position of the second objective lens 48 is closer to the optical disc than the mounting position of the first objective lens 38.

As shown in FIG. 5, the second lens fixture hole 242 is provided with a cylindrical step portion 2421 in which the second objective lens 48 can be inserted. The cylindrical step portion 2421 of the second lens fixture hole 242 is engaged with the retained portion 481 of the second objective lens 48, and the cylindrical step portion 2421 is bonded to the retained portion 481 by adhesive. Although it is not shown in the drawings, the upper end portion of the cylindrical step portion 2421 is provided with an inlet recess for injecting adhesive, so that adhesive is injected from the inlet recess for fixing a side circumference portion of the retained portion 481 is fixed to the cylindrical step portion 2421 by adhesive. It is preferable to use adhesive that can fix the second objective lens 48 to the cylindrical step portion 2421 securely and hardly cause a malfunction such as deformation or break of the second objective lens 48 due to a stress generated by curing condition (heat or the like) or contraction when it is cured. Although it is not limitation, an ultraviolet curing adhesive is adopted in this example.

Figure 6A:
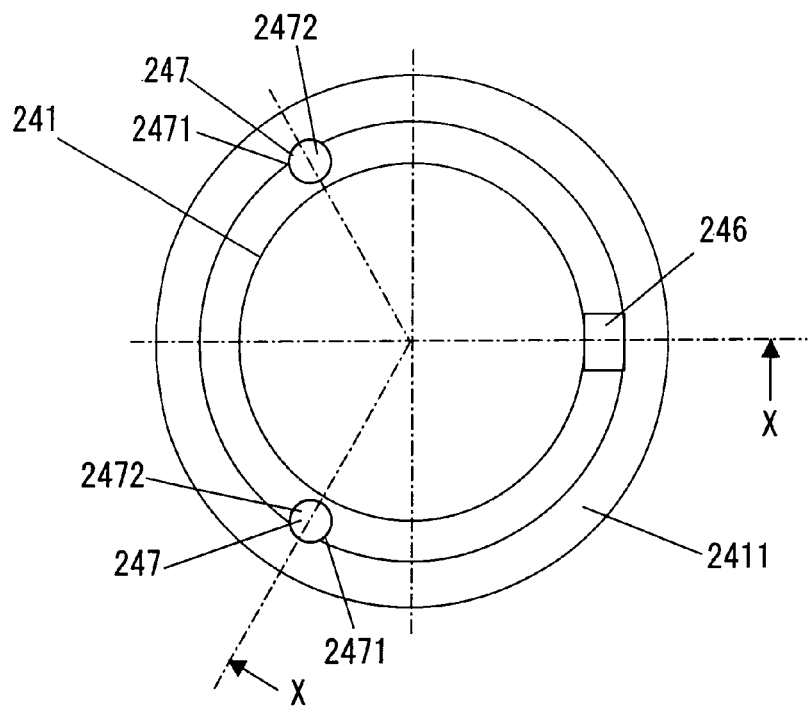
FIG. 6A is a plan view of a first objective lens fixture hole.
Figure 6B:
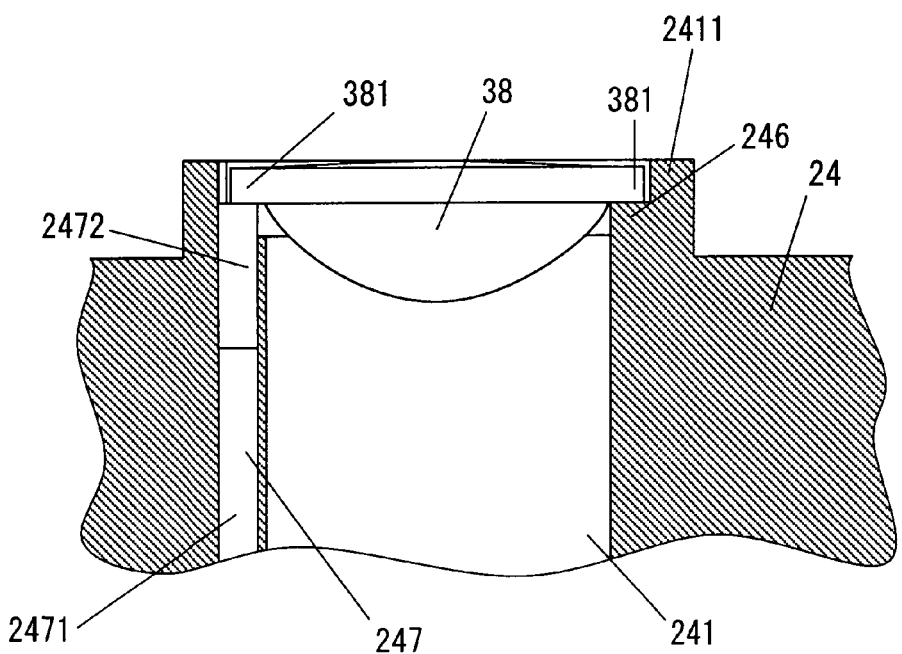
FIG. 6B is a cross sectional view of the first objective lens fixture hole shown in FIG. 6A cut along the line X-X.

FIG. 6A is a plan view of the first objective lens fixture hole, and FIG. 6B is a cross sectional view of the first objective lens fixture hole shown in FIG. 6A cut along the line X-X. As shown in FIGS. 6A and 6B, the first objective lens fixture hole 241 is provided with a cylindrical step portion 2411 to which the first objective lens 38 can be inserted. The upper portion of the first objective lens fixture hole 241 has one fixed lens supporting portion 246 and two movable lens supporting portions 247 for supporting the lower surface of a retained portion 381 of the first objective lens 38. The fixed lens supporting portion 246 protrudes from an inner circumferential surface of the first objective lens fixture hole 241. The movable lens supporting portion 247 extends along the first lens fixture hole 241 and has a cylindrical through hole 2471 that passes through from the lower surface of the objective lens holder 24 to the upper surface side of the first lens fixture hole 241 and a cylindrical column member 2472 that is engaged with the through hole 2471 to the extent that it does not move by its weight. The through hole 2471 is formed in the cylindrical step portion 2411, and a part of the upper portion thereof is opened to the first objective lens fixture hole 241.

Figure 7:
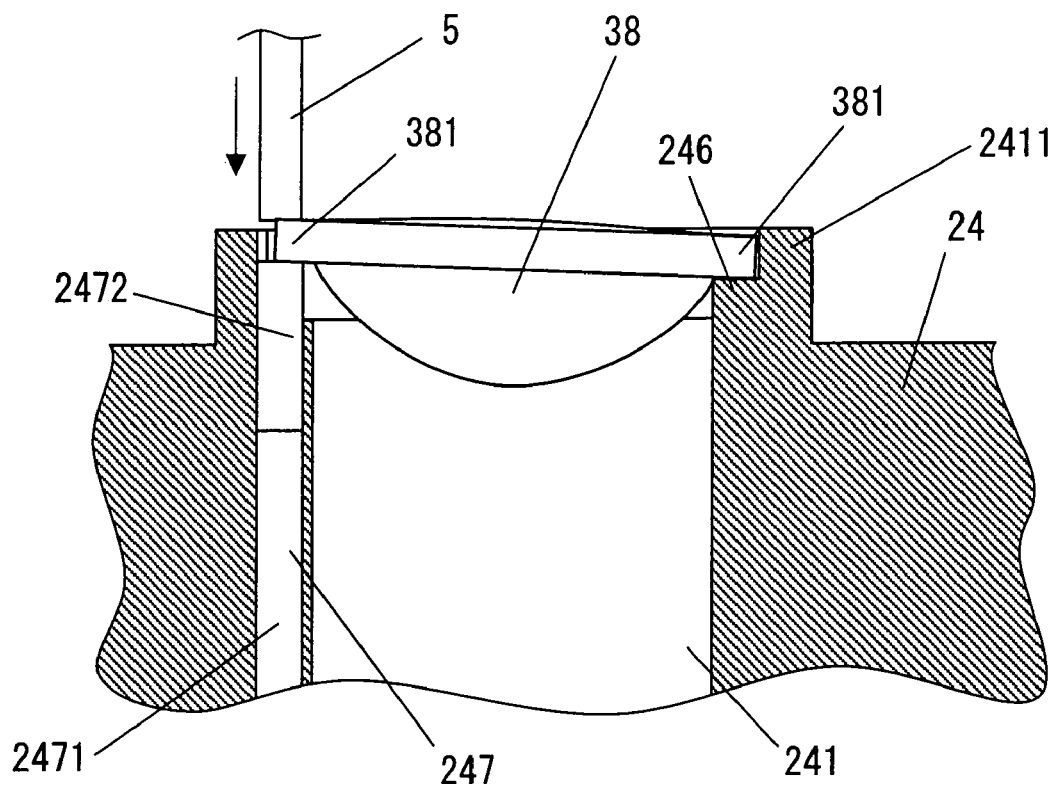
FIG. 7 is a cross sectional view showing an adjusted state of the first objective lens.

FIG. 7 is a cross sectional view showing an adjusted state of the first objective lens. When the first objective lens 38 is attached to the first fixture hole 241, the column member 2472 is first set to protrude from the part of the upper portion of the through hole 2471 that is opened, and the first objective lens 38 is inserted from the upper portion. On this occasion, the column member 2472 is arranged to protrude upward from the fixed lens supporting portion 246. The inserted objective lens 38 is supported by the fixed lens supporting portion 246 and the column members 2472 at the lower surface of the retained portion 381. Then, the upper portion of the retained portion 381 of the objective lens 38 is pressed by using the jig 5. The column member 2472 is pressed by the retained portion 381 and slides toward the inside of the through hole 2471. The pressing position and pressing quantity are adjusted appropriately so that the optical axis of the first objective lens 38 is tilted. Thus, tilt degree thereof can be adjusted. When the adjustment of tilt degree of the first objective lens 38 is finished, adhesive is injected from a lower portion of the through hole 2471 so that the column member 2472 is adhered and fixed. In addition, adhesive is injected into an adhesive recess (not shown) for injecting adhesive that is formed at the cylindrical step portion 2411 so that the first objective lens 38 is adhered and fixed to the first objective lens fixture hole 241. Alternatively, adhesive may be injected into a recess formed at the cylindrical step portion 2411 of the upper portion of the through hole 2471 for fixing the same. In this case, the column member 2472 is also fixed from the upper portion at the same time so that the first objective lens 38 can be fixed more stably.

Here, inclination (tilt degree) of the first objective lens 38 is adjusted to be the same as tilt degree of the second objective lens 48 that is fixed to the second objective lens fixture hole 242. Thus, if the actuator 2 with the objective lens holder 24 is attached to the main body 1 of the optical pickup A so that the optical axis of the second objective lens 48 is perpendicular to a recording surface of a BD medium, the optical axis of the first objective lens 38 becomes perpendicular to a recording surface of a CD medium or a DVD medium, too. Thus, coma aberration due to a shift of tilt degree of the first objective lens 38 can be reduced.

The adjustment of tilt degree of the first objective lens 38 can be performed by adopting a method in which light for adjustment is projected to the first objective lens 38 and the second objective lens 48 by using an autocollimator so that reflection light from each edge surface is received.

In this way, optical axes of the infrared laser beam, the red laser beam and the blue laser beam become parallel to each other by adjusting the tilt degree of the first objective lens 38 to be the same or substantially the same as tilt degree of the second objective lens 48. Thus, if the actuator 2 is arranged so that the blue laser beam going out from the second objective lens 48 becomes perpendicular to the recording surface of the BD medium, the infrared laser beam from the first objective lens 38 and the red laser beam are projected perpendicularly or substantially perpendicularly to the recording surface of the CD medium and the DVD medium, respectively. Thus, only if the actuator 2 is arranged to match the tilt degree of the second objective lens 48, the first objective lens 38 also has an appropriate tilt degree with respect to the CD medium and the DVD medium. Therefore, it is possible to support a BD, a DVD and a CD only by adjusting the actuator. As a result, effort and time necessary for assembling and adjustment can be reduced, so it is possible to reduce a cost necessary for manufacturing and assembling.

In addition, since the tilt degree of the first objective lens 38 can be adjusted, it is not necessary to maintain very high accuracy in making the retained portion 381 of the first objective lens 38, retained portion 481 of the second objective lens 48, the first objective lens fixture hole 241 and the second objective lens fixture hole 242. Thus, it is possible to reduce cost largely for manufacturing and assembling the optical pickup.

Figure 8:
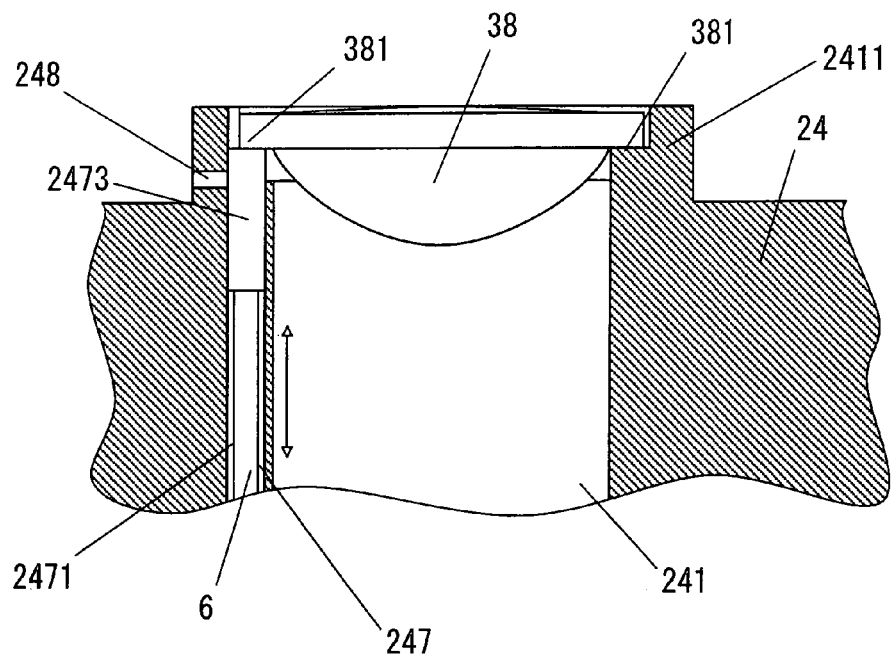
FIG. 8 is a cross sectional view of another example of the first objective lens fixture hole.

Furthermore, as shown in FIG. 8, a column member 2473 of the first objective lens fixture hole 241 may engage with the through hole 2471 with a clearance and have a adhesive injection hole 248 that communicates to the through hole 2471 at the side surface. In addition, since the column member 2473 slide downward by its weight in the through hole 2471, the jig 6 is inserted from the lower side of the through hole 2471 so as to support the column member 2473.

After arranging the first objective lens 38 in the first objective lens fixture hole 241, the jig 6 is used for pressing the lower surface of the first objective lens 38 via the column member 2473 for adjusting tilt degree of the first objective lens 38 to be the same or substantially the same as tilt degree of the second objective lens 48. When the adjustment of the first objective lens 38 is finished, adhesive is injected from the adhesive injection hole 248 so that the column member 2473 is adhered and fixed to the through hole 2471. In addition, adhesive is injected to an adhesive recess (not shown) for injecting adhesive that is formed at the upper surface of the first objective lens fixture hole 241, so that the first objective lens 38 is fixed to the first objective lens fixture hole 241. After finishing the adhesion, the jig 6 is pulled out of the through hole 2471, and attachment of the first objective lens 38 to the first objective lens fixture hole 241 is completed.

Figure 9:
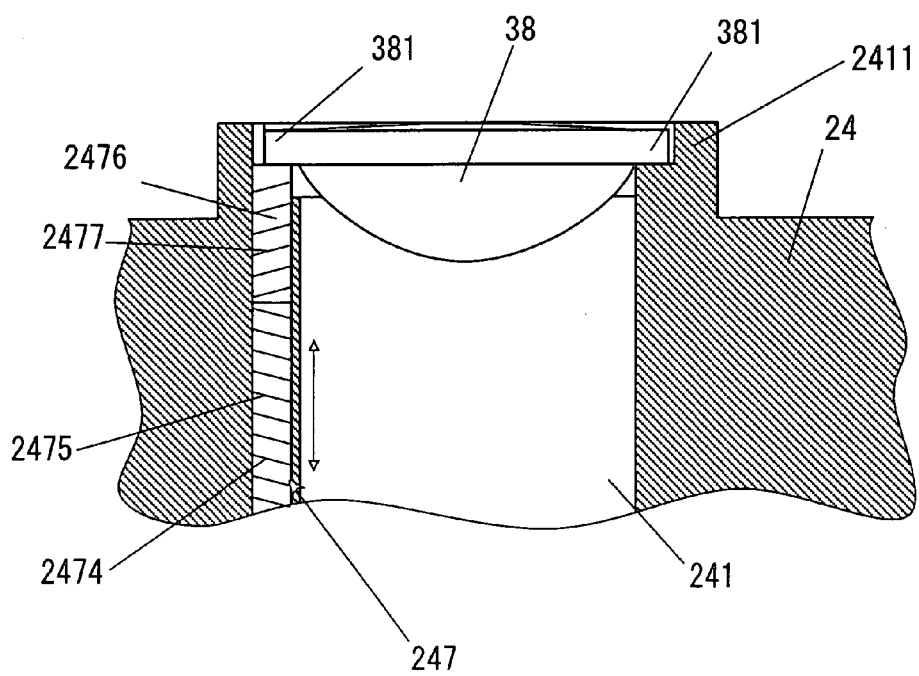
FIG. 9 is a cross sectional view of still another example of the first objective lens fixture hole.

Furthermore, as shown in FIG. 9, a male screw thread 2477 may be formed on the outer circumferential surface of the column member 2476 while a female screw thread 2475 may be formed on the inner circumferential surface of a through hole 2474 so that the column member 2476 engages with the through hole 2474 for fixing. Note that the column member 2476 is shown with hatching in FIG. 9 for convenience sake. In this case, the column member 2476 can be moved up and down in the direction along the through hole 2474 when it is rotated, and fine adjustment is easy.

Figure 10:
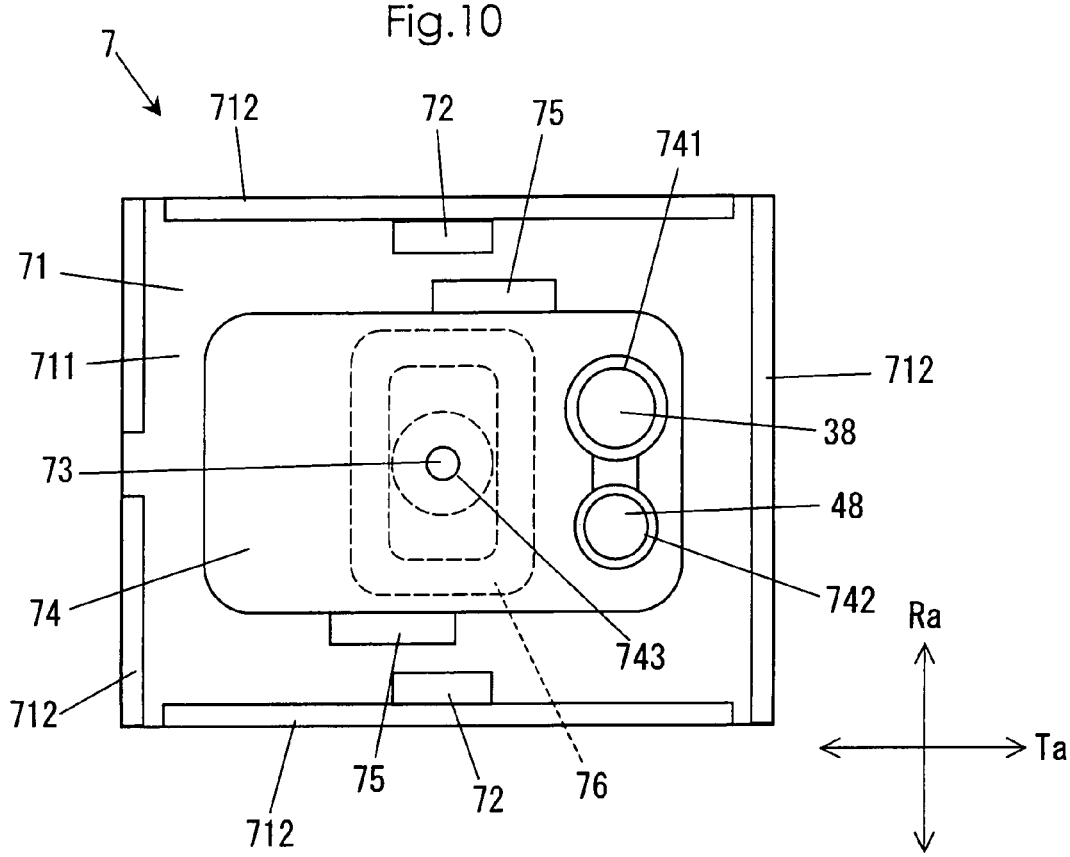
FIG. 10 is a plan view showing another example of the actuator that is used in the optical pickup according to the present invention.
Figure 11:
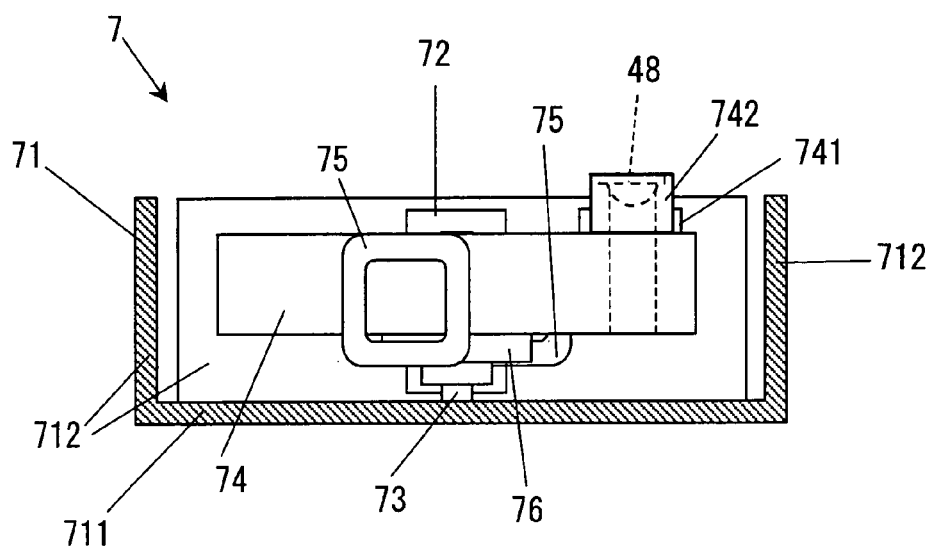
FIG. 11 is a cross sectional view of the actuator shown in FIG. 10.
Figure 12:
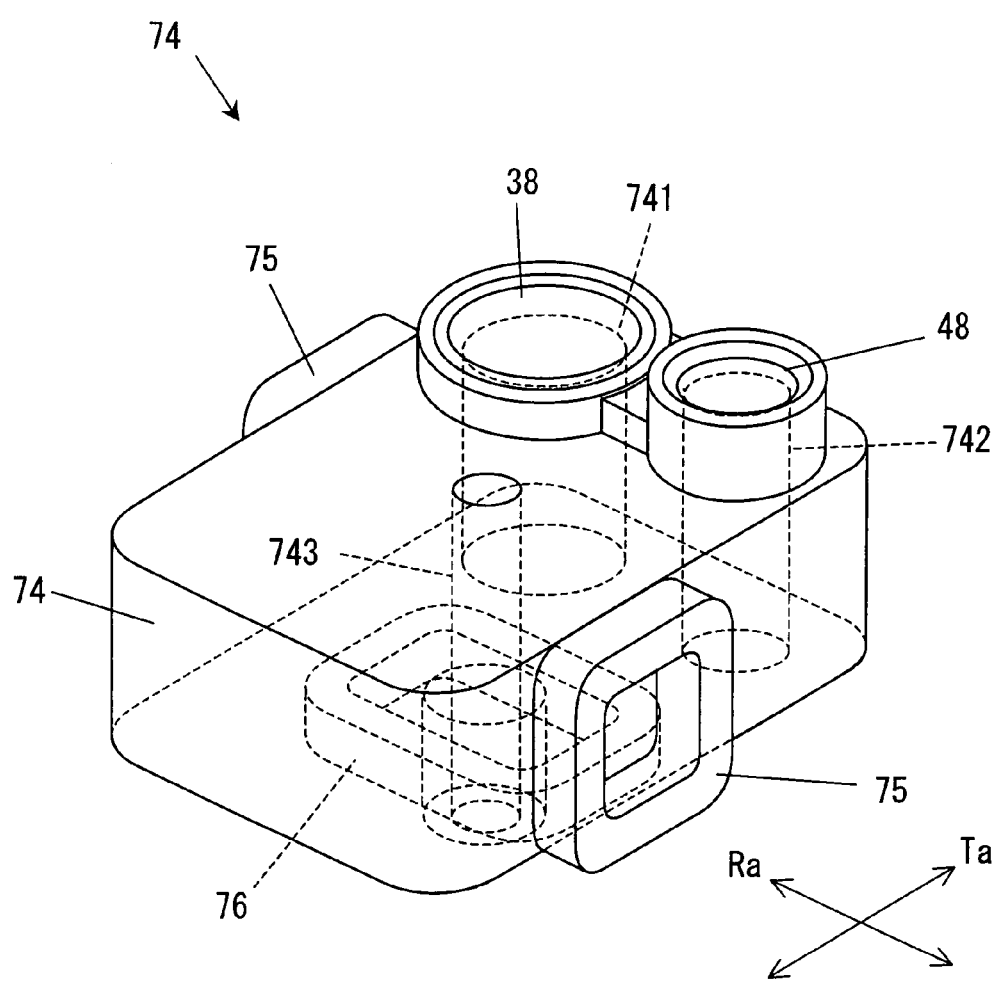
FIG. 12 is a perspective view of the objective lens holder that is used in the actuator shown in FIG. 10.

FIG. 10 is a plan view showing another example of the actuator that is used in the optical pickup according to the present invention, FIG. 11 is a cross sectional view of the actuator shown in FIG. 10, and FIG. 12 is a perspective view of the objective lens holder that is used in the actuator shown in FIG. 10. An actuator 7 shown in FIGS. 10 and 11 is attached to a shaft 73 in a slidable and rotatable manner, which is attached to an actuator base 71.

The actuator 7 shown in FIGS. 10 and 11 includes the actuator base 71, permanent magnets 72, the shaft 73, an objective lens holder 74 that holds the first objective lens 38 and the second objective lens 48, the tracking coils 75 and a focusing coil 76. Reference Ta in FIG. 10 indicates a tangential direction (circumferential direction) of an optical disc medium (a CD medium, a DVD medium or a BD medium), and reference Ra indicates a radial direction thereof. As shown in FIGS. 10 and 11, the first objective lens 38 and the second objective lens 48 are arranged side by side in the Ra direction of the actuator 7.

The actuator base 71 has a rectangular shape viewed from the top, which includes a bottom portion 711 and upstand portions 712 upstanding perpendicularly to the bottom portion 711 from the edges of the bottom portion 711. There is provided with the cylindrical shaft 73 protruding from substantially the middle portion of the bottom portion 711 in the same direction as the upstand portions 712. The upstand portions 712 are provided with two permanent magnets 72 arranged to face each other with the shaft 713 between them (the number of permanent magnets is not limited to two).

As shown in FIG. 12, the objective lens holder 74 has a first objective lens fixture hole 741 to which the first objective lens 38 is attached, a second fixture hole 742 to which the second objective lens 48 is attached, a shaft hole 743 for the shaft 73 to pass through the main body at substantially the middle thereof, the focusing coil 76 arranged to surround the shaft hole 743, the tracking coils 75 arranged on side surfaces to face each other with the shaft hole 743 between them, and a magnetic plate (not shown) arranged on the lower surface of the focusing coil 76. As the mechanism for adjusting tilt degree of the first objective lens 38 in the first objective lens fixture hole 741, any one of the structures shown in FIGS. 6, 8 and 9 can be adopted. Detail description thereof is omitted.

In each example described above, the objective lens that is used for recording or reproducing information on a CD medium and a DVD medium is the first objective lens 38 while the objective lens that is used for recording or reproducing information on a BD medium is the second objective lens 48, and the second objective lens 48 is fixed while tilt degree of the first objective lens 38 adjusted. However, the present invention is not limited to this structure. It is possible to adopt the opposite structure in which the first objective lens 38 is fixed while tilt degree of the second objective lens 48 is adjusted. However, it is preferable to fix the objective lens for a BD medium (i.e., the second objective lens 48 in this example) that is sensible to variation of tilt degree (i.e., that is easy to cause coma aberration), and to adjust objective lens for a CD/DVD that is not so sensible to variation of tilt degree (i.e., the first objective lens in this example) so as to match the second objective lens 48.

Although the first optical system for recording or reproducing a CD medium and/or a DVD medium and the second optical system for recording or reproducing a BD medium are disposed independently of each other in each example described above, the present invention is not limited to this structure. It is possible to adopt another structure in which a part of the optical system (e.g., from the polarizing beam splitter to the quarter wavelength plate) is shared by the first and the second optical system. In this case, it is necessary to provide a member that separates the laser beam after passing through the quarter wavelength plate so that the infrared laser beam and the red laser beam enter the first objective lens while the blue laser beam enters the second objective lens. However, the optical pickup can be downsized and the number of elements can be reduced by the sharing of a part of the optical system. Therefore, effort and time necessary for assembling and adjustment can be reduced, so that manufacturing cost can be reduced. In addition, the optical pickup can also be used for recording or reproducing information on an HD-DVD (registered trade mark) using a blue laser beam and an objective lens having the same numerical aperture as for the DVD medium.

Although the embodiment of the present invention is described above concretely, the present invention is not limited to the embodiment described above, which can be modified variously within the scope of the present invention without deviating from the spirit thereof. The optical pickup of the present invention may have a plurality of features described above in the embodiment.

What is claimed is:

1. An optical pickup, comprising:
   two objective lenses having different numerical apertures; and
   an objective lens holder that holds the two objective lenses, characterized in that
   the objective lens holder has two fixture holes that pass through from the lower surface to the upper surface to which the two objective lenses are attached at an upper portion with space between them,
   one of the fixture holes is provided with a tilt degree adjustment mechanism for supporting the lower surface of the objective lens that is attached to the fixture hole and adjusting an angle of the objective lens,
   the tilt degree adjustment mechanism includes a fixed lens supporting portion and a plurality of movable lens supporting portions that can slide in a direction along the fixture hole,
   the movable lens supporting portion includes a through hole that passes through from the lower surface of the lens holder to an upper portion of the fixture hole and a column member that is inserted in the through hole in a slidable manner, and
   the column member can be fixed to the through hole by adhesive.

2. The optical pickup according to claim 1, characterized in that
   the tilt degree adjustment mechanism includes a fixed lens supporting portion and two movable lens supporting portions.

3. The optical pickup according to claim 1, characterized in that
   the through hole has a cylindrical shape while the column member has a cylindrical column shape.

4. The optical pickup according to claim 1, characterized in that
   the column member is fit in the through hole by light press fitting.

5. The optical pickup according to claim 3, characterized in that
   the inner circumferential portion of the through hole is provided with a female screw thread while the outer circumferential portion of the column member is provided with a male screw thread, so that the column member engages with the through hole.

6. The optical pickup according to claim 1, characterized in that
   the column member engages with the through hole with a clearance between them.

7. The optical pickup according to claim 1, characterized in that
   the lower end portion of the through hole is used as an injection hole for adhesive.

8. The optical pickup according to claim 1, characterized in that
   the objective lens holder is provided with an adhesive injection hole that communicates to the through hole at the side surface.

9. The optical pickup according to claim 1, characterized in that
   the objective lens holder is supported by elastic supporting members, and electric power is supplied via the elastic supporting members to a tracking coil and a focusing coil that are provided for driving the objective lens holder.

10. The optical pickup according to claim 1, characterized in that
    the objective lens holder is supported in a slidable and rotatable manner by a rotating shaft that passes through the objective lens holder.

11. The optical pickup according to claim 1, characterized in that
    at least two types of optical disc media among a CD, a DVD and a BD can be supported as for recording or reproducing information.

12. An optical pickup, comprising:
    an infrared laser light source that emits an infrared laser beam;
    a red laser light source that emits a red laser beam;
    a blue laser light source that emits a blue laser beam;

a first objective lens that condenses the infrared laser beam or the red laser beam onto a recording surface of a CD medium or a DVD medium;

a second objective lens that condenses the blue laser beam onto a recording surface of a Blu-ray Disc medium;

an objective lens holder that holds the first objective lens and the second objective lens, and can move in a tracking direction and in a focus direction;

a tracking coil that generates a thrust force for moving the objective lens holder in the tracking direction;

a focusing coil that generates a thrust force for moving the objective lens holder in the focus direction; and elastic supporting members that support the objective lens holder in an elastic manner and are used for supplying electric power to the tracking coil and the focusing coil, characterized in that the objective lens holder has a first fixture hole that passes through from the lower surface to the upper surface to which the first objective lens is attached at an upper portion, and a second fixture hole that passes through from the lower surface to the upper surface to which the second objective lens is attached at an upper portion, the first fixture hole is provided with a tilt degree adjustment mechanism for supporting the lower surface of the first objective lens and adjusting an angle of the first objective lens, the tilt degree adjustment mechanism includes a fixed lens supporting portion that is fixed to the inner circumferential surface of the first fixture hole so as to protrude, and two movable lens supporting portions that are disposed at positions away from the fixed lens supporting portion by the same angle and can slide in the direction along the first fixture hole, the movable lens supporting portion includes a cylindrical through hole that passes through from the lower surface of the lens holder to an upper portion of the first fixture hole and a column member that is fit in the through hole by light press fitting, and adhesive is applied to the through hole so as to fix the column member from the lower side.

* * * * *